United States Patent

[11] 3,621,941

| [72] | Inventor | Bennett Osborn Blout<br>Berwyn, Ill. |
|---|---|---|
| [21] | Appl. No. | 887,083 |
| [22] | Filed | Dec. 22, 1969 |
| [45] | Patented | Nov. 23, 1971 |
| [73] | Assignee | Amsted Industries Incorporated<br>Chicago, Ill. |

[54] BRAKE MECHANISM
6 Claims, 11 Drawing Figs.

[52] U.S. Cl. ................................................ 188/52,
188/153 R, 188/196 V
[51] Int. Cl. ............................................. B61h 13/24,
B61h 15/00
[50] Field of Search ............................................ 188/52, 153
R, 153 D, 196 V

[56] References Cited
UNITED STATES PATENTS

| 408,982 | 8/1889 | Lawrence | 188/52 |
|---|---|---|---|
| 1,158,177 | 10/1915 | Christenson | 188/196 V |
| 2,966,963 | 1/1961 | Williams | 188/52 |
| 3,037,398 | 6/1962 | Cross | 188/196 V X |
| 3,101,814 | 8/1963 | Newell | 188/52 X |
| 3,378,108 | 4/1968 | McClure et al. | 188/52 |
| 3,017,959 | 1/1962 | Baechtel | 188/52 |

Primary Examiner—Duane A. Reger
Attorneys—Walter L. Schlegel, Jr. and Norvell Von Behren ABSTRACT: An improved brake mechanism for a railway vehicle truck which may be mounted as shown in the various positions in the drawings and comprises one or more reinforced rubber convolute actuators which replace the standard brake cylinders used in prior art mechanisms. The actuators are without sliding or moving air seals which may be affected by water or ice and require no periodic internal inspection and maintenance.

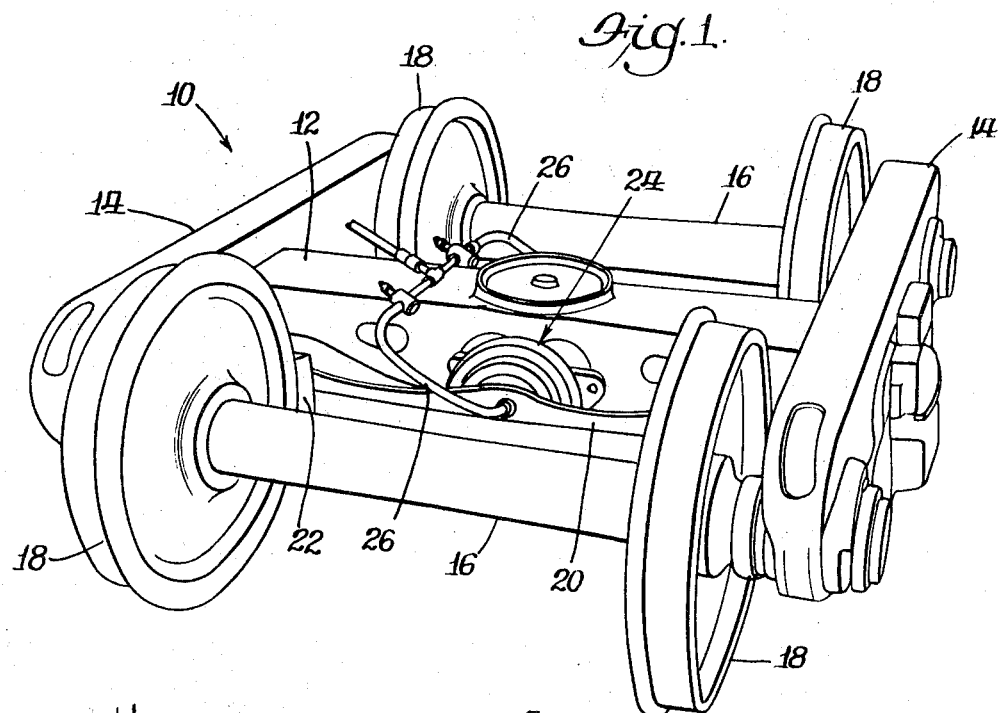

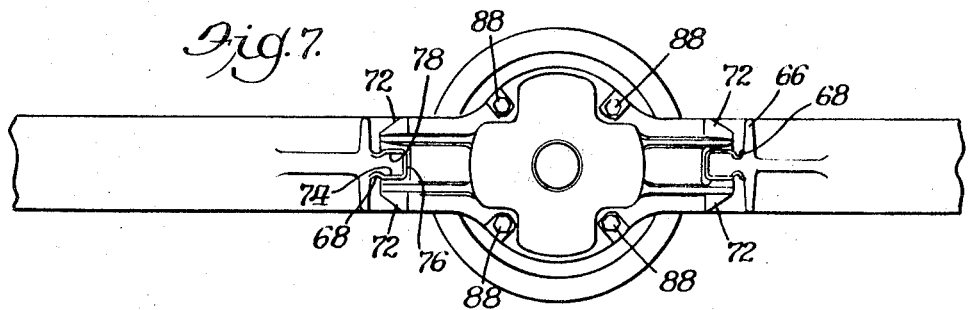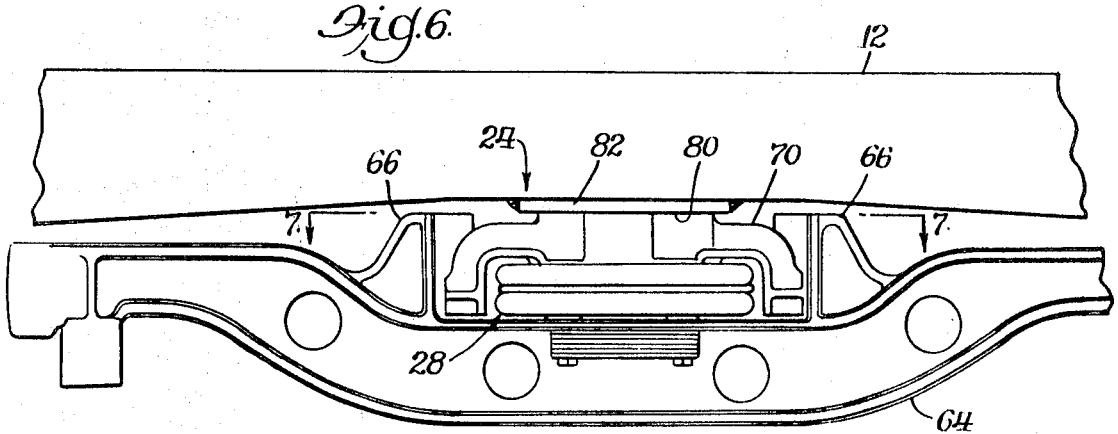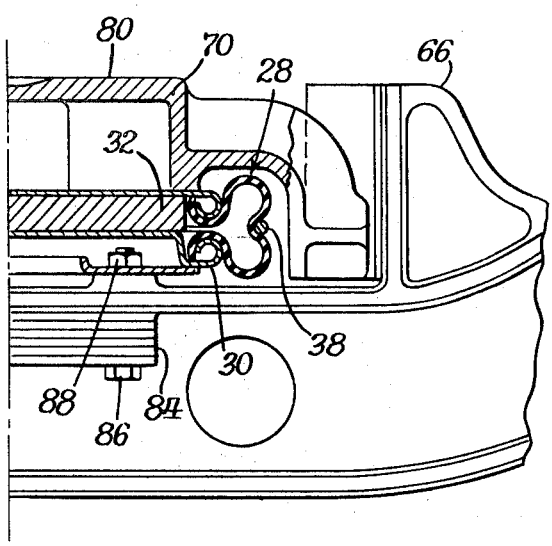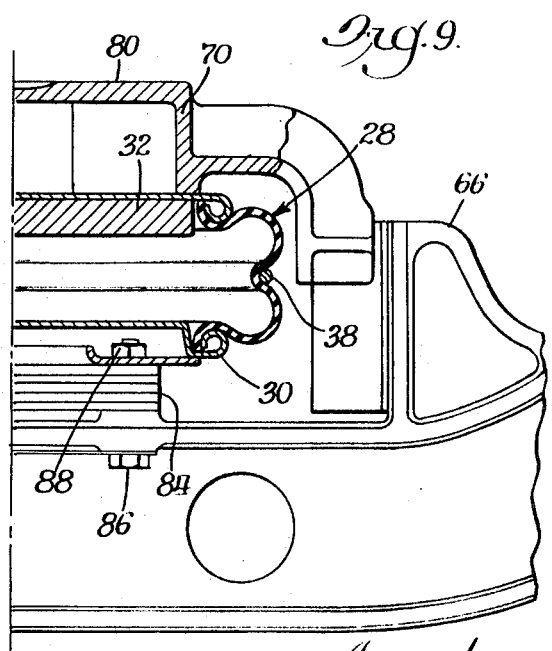

Inventor:
Bennett O. Blout

BRAKE MECHANISM

BACKGROUND OF THE INVENTION

This invention relates to a brake rigging for a railway vehicle truck and more particularly to a new and improved brake rigging for railway freight cars.

Prior art freight car brake riggings generally consist of one or more air-actuated brake cylinders which are carried on the car body underside. The brake cylinders piston rods are connected to individual brakeshoes, located at each wheel, by means of a plurality of rods, levers and other miscellaneous hardware.

The introduction of the composition brakeshoe for railway rolling stock made it desirable to find new types of brake rigging in order to use the higher friction coefficient of the composition shoe to the best advantage since smaller braking forces were needed for this type of brakeshoe. One new type of brake rigging is shown in the U.S. Pat. No. 2,958,398, issued to G. K. Newell on Nov. 1, 1960 and comprises a pair of brake cylinders mounted on one brake beam with push rods exerting a force on the other brake beam.

Another type of brake rigging is shown in the U.S. Pat. No. 2,958,397, issued to G. K. Newell on Nov. 1, 1960 and comprises a single brake cylinder mounted on each brake beam in such a manner as to react with the truck bolster to cause the application of the braking force to the brakeshoes. Since both of the above new types of brake rigging used standard-type brake cylinders they have the inherent problem of requiring periodic internal inspection and maintenance of the sliding and moving parts of the cylinder to insure that no difficulties will be encountered during operation from sticky or frozen parts caused by ice, water or dirt getting into the brake cylinder.

SUMMARY OF THE INVENTION

In order to eliminate the problems inherent in the prior art brake riggings and to provide a lightweight and low-cost brake rigging which has no internal seals or moving parts, there is provided by the present invention a new and improved novel brake rigging utilizing a reinforced rubber convoluted actuator in place of the standard brake cylinder of prior art use. The actuator in mounted in various positions as will be more fully described hereafter to provide various combinations of brake rigging to suit the varying needs of the railroads.

Accordingly, it is an object of the invention to provide a new and novel brake rigging using means other than a brake cylinder to effect the braking force.

Another object of the invention is to provide a new and novel use of a reinforced rubber convoluted actuator to provide a lightweight and low-cost brake rigging having varying braking characteristics when used as hereinafter described.

Yet, another object of the invention is to provide a new and novel brake rigging which requires less maintenance than conventional brake rigging due to the elimination of the sliding and moving air seals associated with conventional airbrake cylinders.

These and other objects and advantages will become apparent from a study of the attached drawings and from a reading of the specification.

BRIEF DESCRIPTION OF THE DRAWINGS

FIG. 1 is a perspective view of a railway truck showing one form of the invention mounted on the brake beams;

FIG. 2 is a plan view, of a brake rigging for a four-wheel, two-axle car truck showing one form of the invention;

FIG. 6 is a plan view of a brake rigging for a four-wheel, two-axle car truck showing another form of the invention;

FIG. 7 is a view taken along line 7—7 of FIG. 6;

FIG. 8 is an enlarged plan view, partially in section, of the brake rigging shown in FIG. 6 showing the actuator in the unactuated position;

FIG. 9 is an enlarged plan view, partially in section and similar to FIG. 8 showing the actuator in the actuated or expanded position;

FIG. H10 is a partial plan view, partially in section, of a brake rigging for a four-wheel, two-axle car truck showing still another form of the invention which may be used to provide varying braking characteristics.

DESCRIPTION OF THE PREFERRED EMBODIMENT

Figure 3:
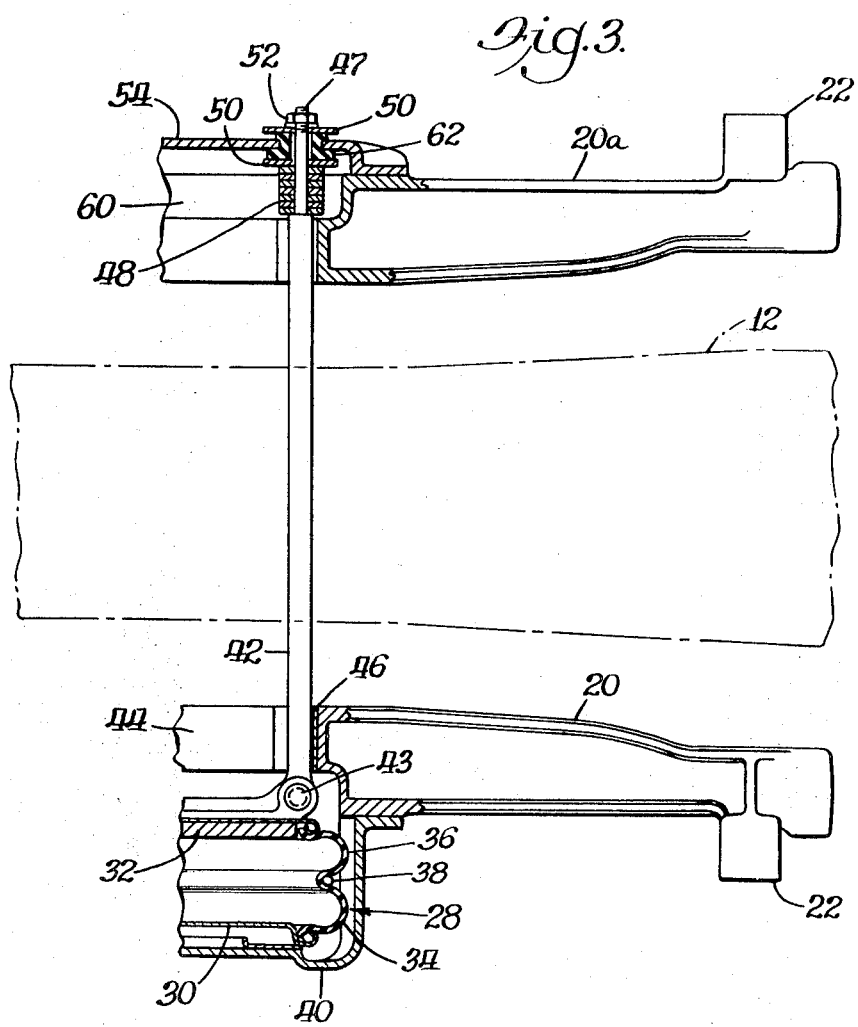
FIG. 3 is a plan view, partially in section of the brake rigging shown in FIG. 2.

Referring now to the drawings and particularly to FIG. 1 there is shown generally at 10 a standard railway car truck which comprises a transversely extending truck bolster 12 resiliently mounted on a pair of truck side frames 14 by a plurality of springs (not shown in the drawings). The truck 10 contains a pair of axles 16 having wheels 18 mounted thereon, the axles being journaled in the side frames 14 by well-known means.

Also contained within the truck 10 are a pair of transversely extending brake beams 20 and 20a which are supported at the ends thereof by the truck 10 in a well-known manner for slidable movement of the brakeshoe 22 to a braking position against the wheels 18 of the truck 10. Mounted in the central portion of the truck 10, as will be more fully described hereafter, is one or more air actuators, shown generally at 24 which are connected to the train compressed air system by a plurality of air lines 26.

The air actuator 24 is in the form of a reinforced rubber convoluted bellows which is designed to replace the standard brake cylinders found on prior art railway car trucks which not only leaked compressed air but introduced considerable sliding friction in the cylinder which reduced the effective braking force applied to the brakeshoes 22. In addition, prior art brake cylinders, due to the sliding and moving of the internal parts, were subjected to the effects of dirt, water and ice often encountered in railroad operations.

Figure 4:
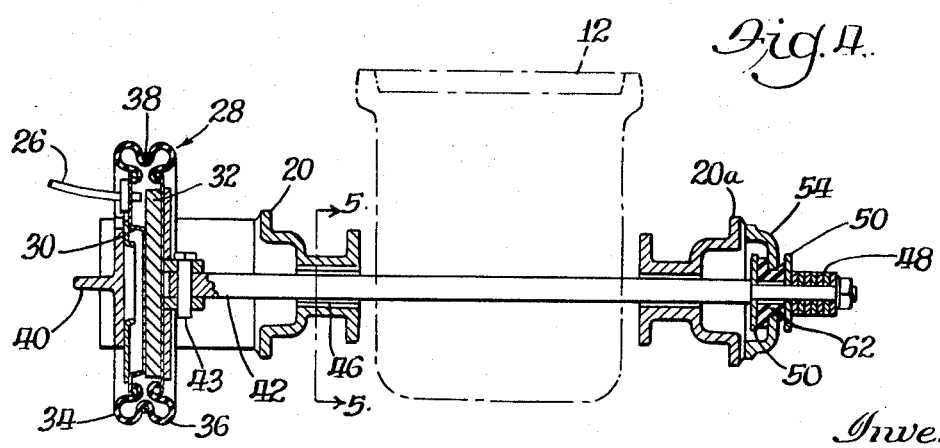
FIG. 4 is a side elevational view, partially in section, of the brake rigging shown in FIG. 2.
Figure 5:
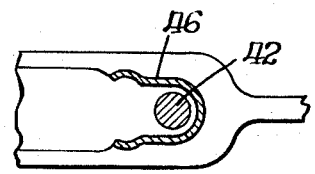
FIG. 5 is a sectional view taken along line 5—5 of FIG. 4.

Referring now to FIGS. 2 to 5, there is shown the basic invention utilizing one air actuator 24 mounted in the central portion of the brake beam 20 of the car truck 10. The actuator 24 comprises a flexible reinforced convoluted bellows, shown generally at 28 which is sealed at its ends by a pair of circular end plates 30 and 32. The bellows 28 is formed of two convolutes 34 and 36 separated by a retaining ring 38 which acts to restrain the outward movements, in a controlled manner, of the bellows 28 whenever air pressure is developed in the actuator by means of the air line 26, as shown in FIG. 4.

The rubber bellows 28 contains reinforcing cords which are molded into the rubber as an aid to maintaining a fairly constant cross-sectional length of the convolutes 34 and 36 throughout the stroke of the actuator.

When air pressure is developed inside bellows 28, the convolutes 34 and 36 tend to seek a circular form with the diameter of the effective area of the actuator 24 being defined by the distance between the radial centers of the convolutes. The retaining ring 38 which floats between the convolutes 34 and 36 permits the convolutes to seek and develop equal effective areas. When air pressure is applied to this effective area, the actuator 24 develops the force necessary to operate the train brakes in a controlled manner.

The predicted performance characteristics of this brake arrangement as applied to a typical 100-ton freight car are shown in solid lines on the following Graph "A" which has superimposed thereon, in dashed lines, the braking characteristics of a typical prior art brake rigging using conventional brake cylinders. The curves for the present invention indicate movement of each brake beam whereas the prior art curves indicate total separation movement between the brake beams.

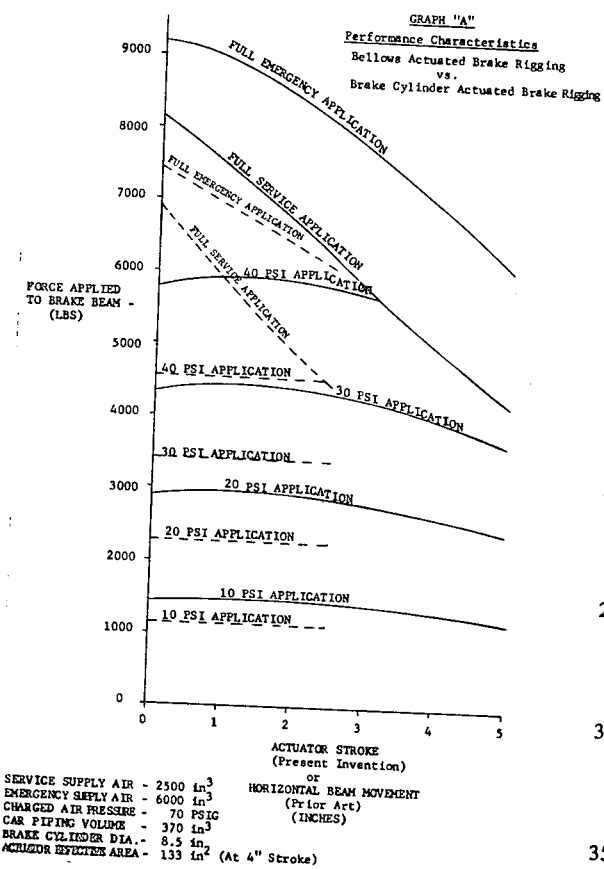

GRAPH "A"
Performance Characteristics
Bellows Actuated Brake Rigging
vs.
Brake Cylinder Actuated Brake Rigging SERVICE SUPPLY AIR - 2500 in³
EMERGENCY SUPPLY AIR - 6000 in³
CHARGED AIR PRESSURE - 70 PSIG
CAR PIPING VOLUME - 370 in³
BRAKE CYLINDER DIA.- 8.5 in
ACTUATOR EFFECTIVE AREA - 133 in² (At 4" Stroke)

Returning now to the drawing FIGS. 2 to 5, the braking force is generated by the actuator 24 using the stored air supply of the freight car and using conventional controls and connections to apply air to the actuator 24 by means of the air line 26. Air pressure thusly applied to the actuator develops a force in a direction tending to separate the actuator end plates 30 and 32.

The end plate 30 is restrained from horizontal movement by means of the member 40 which is rigidly fastened to the brake beam 20 by well-known fastening means such as bolts, rivets or a welded joint. The end plate 32 is free to move horizontally to transmit the force of the actuator 24 through a pair of push rods 42 to force the pair of brake beams 20 and 20a apart thereby forcing the brakeshoes 22 against the wheels 18 and effecting the braking of the train. The push rods 42 are attached to the end plate 32 by means of a pin and clevis connection 43 which, with the flexibility of the actuator 24, permits the brake beam 20 to have sufficient angularity to overcome unequal brakeshoe thickness without effecting the action of the bellows 28.

The push rods 42 as well as the actuator 24 are supported and limited in their vertical and horizontal travel by passing them through an opening 44 in the brake beam 20 containing the actuator 24. In order to restrict the lateral and vertical movement of the ends of bellows 28 relative to each other to minimize cold working of the rubber bellows, which may cause a subsequent rupture of the bellows, there is provided means for restricting the lateral and vertical movement in the form of a pair of U-shaped wear plate members 46 which are rigidly fastened to the brake beam 20.

The ends 47 of the push rods 42 are threaded to receive a plurality of spaced shims 48 which are retained on the push rod 42 by means of a pair of washers 50 and nut 52. The shims 48 function as a means to adjust the horizontal distance between the brake beams 20 and 20a to compensate for wheel and brake shoe wear as well as tolerance variations on the wheel thereby insuring that an equal braking force will be applied by the actuator 24 to each wheel 18 of the truck 10. Adjustment for specific wheel diameters may also be made by adding or removing an appropriate number of shims 48 from the end 47 of the push rods 42.

In FIG. 2 and FIG. 4 the shims 48 are shown on the outside of the member 54 which is rigidly fastened to the brake beam 20a by means of a plurality of bolts 56 and nuts 58. It is apparent that the shims 48 may also be interchangeably contained on the end 47 of the push rods 42 within the member 54 in the opening 60, as shown in FIG. 3, without departing from the spirit and scope of the invention. Such interchangeability permits great latitude in varying the horizontal distance between the brake beams 20 and 20a to accommodate various wheel diameters by changing the location of the shims 48 from the position shown in FIG. 2 and FIG. 4 to the position shown in FIG. 3.

Contained on the ends 47 of the push rods 42 within the washers 50 are a plurality of pads 62 which serve as resilient means to permit lateral and angular motion between the brake beams 20 and 20a caused by unequal brakeshoe thickness.

Sufficient stroke is provided for the actuator 24 to permit the railroad car to brake under normal conditions of wheel and brakeshoe wear and to allow the brakeshoes 22 to retract sufficiently from the wheels 18 so that the brakeshoes 22 may be changed when the brakes are not applied in the truck 10. From experimentation, it has been found that five-eighths inch are needed for release of the brakes with one-half inch required for wheel wear and seven-eighths inch required for brake shoe wear for each brake beam when 1¼-inch brakeshoes are used. As a result, a stroke of 4 inches is required for the actuator 24 to operate effectively as shown in Graph "A."

Referring now to FIGS. 6 through 9 there is shown a modification of the basic invention which comprises the use of a pair of air actuators 24 mounted on the central portion of each of the brake beams for engagement with the bolster to thereby actuate the brake beams to a braking position.

In the embodiment shown, the air actuator 24 comprises the convoluted bellows 28 and the pair of end plates 30 and 32 as beforementioned in describing the embodiment shown in FIGS. 2 through 5. The brake beams 64 in this embodiment are constructed in the configuration shown and contain a pair of guide rails 66 having U-shaped wear clips 68 fastened on the inner sides thereof. Rigidly fastened to the end plate 32 is a member 70 which contains a plurality of guide fingers 72 having internal surfaces 74, 76 and 78 which are designed to slide on the guide rails 66.

Contact of the member 70 with the bolster 12 is made by the external surface 80 of the member 70 with the wear plate 82 which is rigidly fastened to the central portion of the bolster 12. The normal relative motion of the bolster 12 with the brake beams is permitted by the sliding contact of the wear plate 82 with the external surface 80 on the member 70. The use of the guide rails 66 in this embodiment also serves as a means for restricting the lateral and vertical movement of the ends of the bellows 28 relative to each other to minimize bellows failure due to cold working of the bellows.

Referring now to FIG. 8 there is shown the means for adjusting the horizontal distance between the bolster 12 and the brake beams 64 to compensate for tolerances caused by variations in wheel and brakeshoe size and also wear on the wheels and brakeshoes. The adjusting means comprises a plurality of shims 84 rigidly held in place by means of a plurality of bolts 86 and nuts 88. The shims may be mounted either in the position shown in FIG. 8 or in the position shown in FIG. 9 is order to provide large latitude in adjusting of the distance between the bolster 12 and the brake beams 64.

It is to be understood that while in the embodiment shown in FIGS. 6 through 9 there is an actuator 24 mounted on each brake beam 64 to engage the bolster 12, it is clear that the actuators could also be mounted on the bolster 12 to engage the brake beams 64 without departing from the spirit and scope of the invention.

Figure 10:
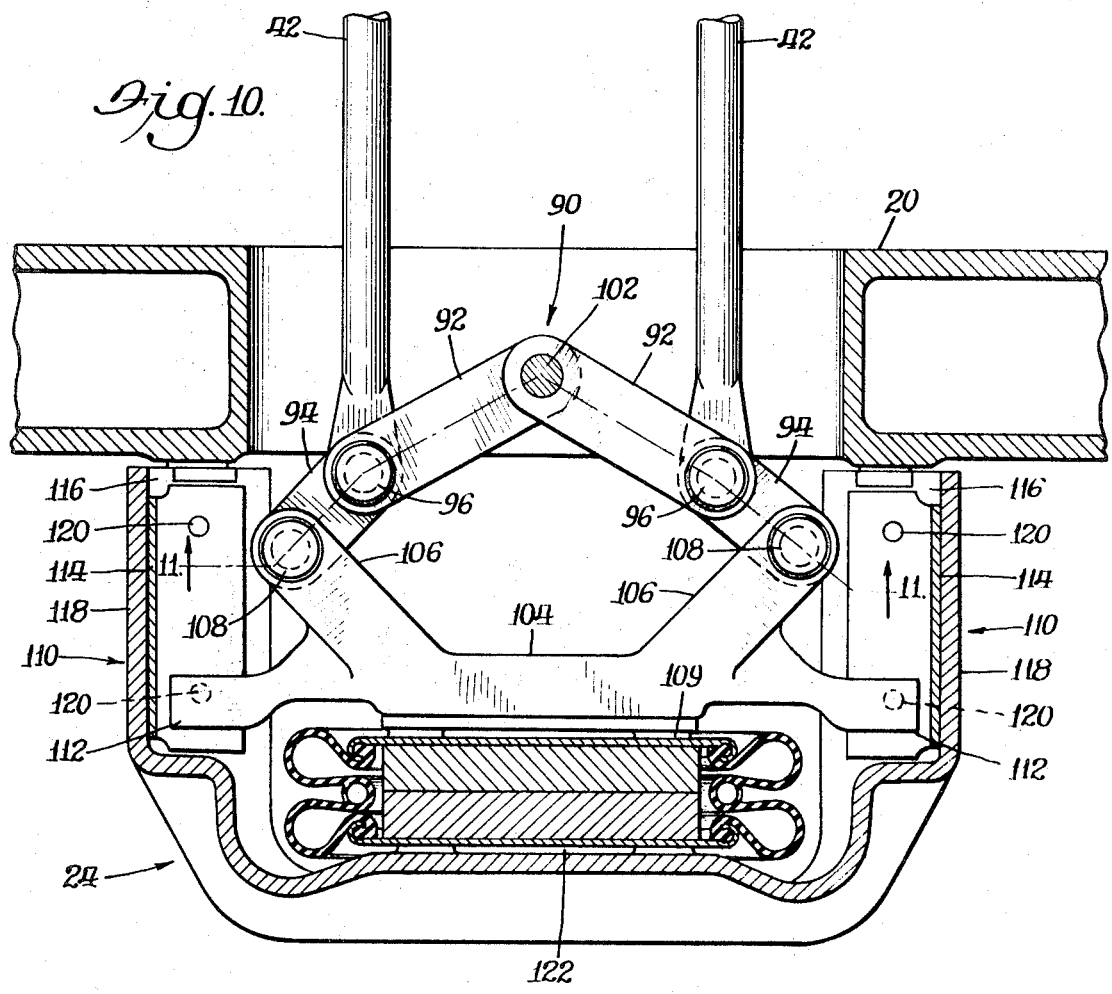
Figure 11:
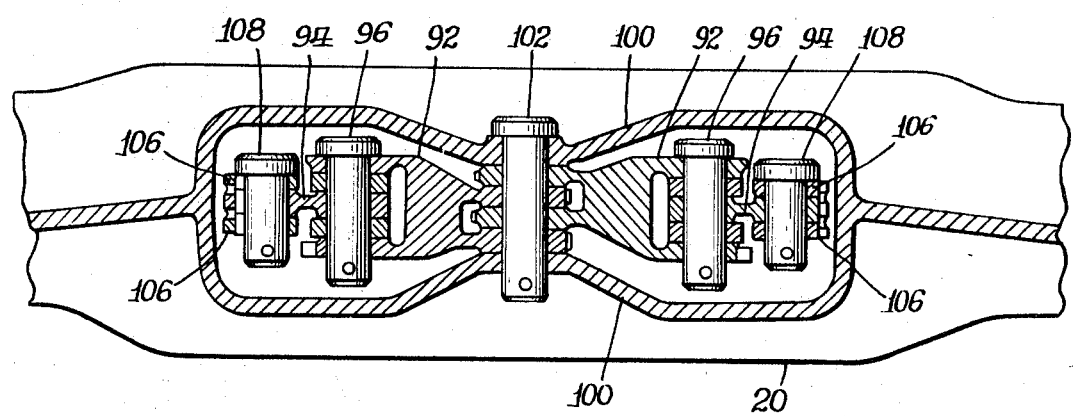
FIG. 11 is a sectional view taken along line 11—11 of FIG. 10.

Referring not to FIGS. 10 and 11 of the drawings, there is shown another modification of the invention wherein the air actuator 24 is mounted on the brake beam 20 with a plurality of push rods 42 extending through the truck bolster 12 and being mounted on the brake beam 20a similar to the mounting shown in FIG. 2. However, in this modification there is interposed between the actuator 24 and the push rods 42, a means for varying the mechanical advantage of the actuator output force so as to decrease the braking force fade when the actuator stroke is increased and to reduce the high braking force obtained at a minimum actuator stroke. Be reducing the initial high braking force, a lighter construction car could be utilized without having excessive high braking ratios whenever the car is empty.

The means for varying the actuator mechanical advantage is shown generally at 90 and comprises two pair of links 92 and 94 which are pivotally mounted to the push rods 42 by the pins 96 and to the web 100 of the brake beam 20 by means of the pin 102. The other ends of the links 94 are pivotably mounted to the frame 104 at its forked ends 106 by the pins 108. The frame 104 is positioned against the end plate 109 of the actuator 24, the actuator being similar in configuration to that shown in FIGS. 2 through 5 of the drawings.

In this embodiment, the means for restricting the lateral movement of the bellow ends to minimize bellows fatigue is shown generally at 110 and comprises a pair of guide rails 112 which are formed on the lower portion of the frame 104 in an outwardly extending manner. The rails 112 are designed to slide horizontally in a pair of U-shaped wear clips 114 which are retained in a recess 116 of the frame 118 by a plurality of pins 120. The frame 118 is rigidly fastened to the brake beam 20 by a plurality of bolts and nuts (not shown in the drawing).

The frame 118 also contains a bottom surface 122 which serves as a stop for the other end of the actuator not connected to the frame 104. In this embodiment, while not shown in the drawing FIGS. 10-11, the ends 47 of the push rods 42 are fastened to the brake beam 20a in a manner similar to that shown in FIGS. 2 through 5 and as before described in the specification. Accordingly, this embodiment also contains the resilient pads 62 as well as the shims 48 for the purposes before described. When the present invention is constructed in the manner shown using the means 90 to varying the mechanical advantage of the actuator stroke, an entirely different braking characteristic can be obtained as shown in the following Graph "B" which has superimposed thereon, in dashed lines, the braking characteristics of a typical prior art brake rigging using conventional brake cylinders.

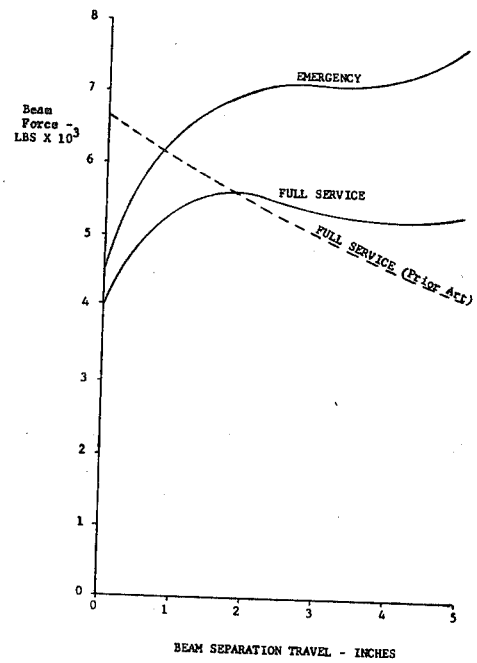

BEAM SEPARATION TRAVEL - INCHES

From the foregoing, it can be seen that there has been provided an improved brake mechanism for a railway vehicle truck which comprises one or more rubber convoluted actuators to replace the standard brake cylinders used in prior art devices. By the use of the actuators and the mechanical rigging herein described, a railroad car may be provided with various beneficial braking characteristics which have heretofore been unobtainable. In addition, the actuators of the invention, having no sliding and moving air seals, require little or none of the maintenance required with conventional brake cylinders. While many changes may be made in the construction details and arrangement of parts without departing from the spirit and scope of the invention as expressed in the accompanying claims, the invention is not to be limited to the exact matters shown and described since the preferred embodiment has been given by way of illustration only.

What is claimed is:

1. In a brake system rigging for a railway vehicle truck, the combination of:
   a. a pair of transversely extending, brakeshoe carrying, brake beams supported at the ends thereof by the truck for slidable movement to a braking position against the wheels of the truck;
   b. a convolute bellows actuator, mounted at one end thereof to one of said brake beams, and
   c. at least one connecting rod connected to the other end of the bellows actuator and connecting the other of said brake beams to said actuator whereby an application of air to said actuator causes the bellows to expand and force said brake beams away from each other and into a braking position.

2. The combination as defined in claim 1 further comprising a wearplate, associated with one of said brake beams, for restricting the lateral movement of the ends of said bellows relative to each other in order to minimize cold working of said bellows and the chances for a subsequent rupture of said bellows resulting from the cold working.

3. The combination as defined in claim 2 further comprising resilient means, associated with the other of said beams, for permitting a limited lateral movement of said brake beams relative to each other without affecting the operation of the braking system.

4. In a braking system for a railway vehicle truck of the type having a pair of slidably mounted, brakeshoe-carrying, brake beams supported at the ends thereof by the truck, the improvement comprising:
   a. a resilient, air-actuated, convoluted bellows actuator mounted on the central portion of one of said brake beams;
   b. a plurality of rods connecting the other of said brake beams to said actuator so that an application of air to said bellows causes said bellows to expand and force said brake beams to a braking position;
   c. means, associated with one of said brake beams for restricting the lateral movement of the bellow ends relative to each other to minimize bellows fatigue and subsequent bellows failure;
   d. resilient means, associated with the other of said brake beams, for permitting lateral motion between said brake beams without affecting the operation of said bellows; and
   e. shim means, associated with the other of said brake beams and said rods, for adjusting the horizontal distance between said brake beams to compensate for wheel and brake shoe wear and tolerance variations on the wheel and brake shoes to insure equal braking force application on each wheel of the truck.

5. In a brake system rigging for a railway vehicle truck, the combination of:
   a. a transversely extending, brakeshoe carrying, brake beam member supported at the ends thereof by the truck for slidable movement of the brake beam and shoes to a braking position against the wheels of the truck;
   b. a truck bolster member, in juxtaposition with said brake beam member;
   a convoluted bellows actuator mounted on one of said members and designed to exert a force on the other of said members whenever an application of air is applied to the bellows to cause said brake beam member to slide to the braking position.

6. The combination as defined in claim 5 further comprising a wearplate, associated with one of said members for restricting the lateral movement of the ends of said bellows relative to each other to minimize bellows failure due to cold working of said bellows during lateral movement.

* * * * *